Figure 1:
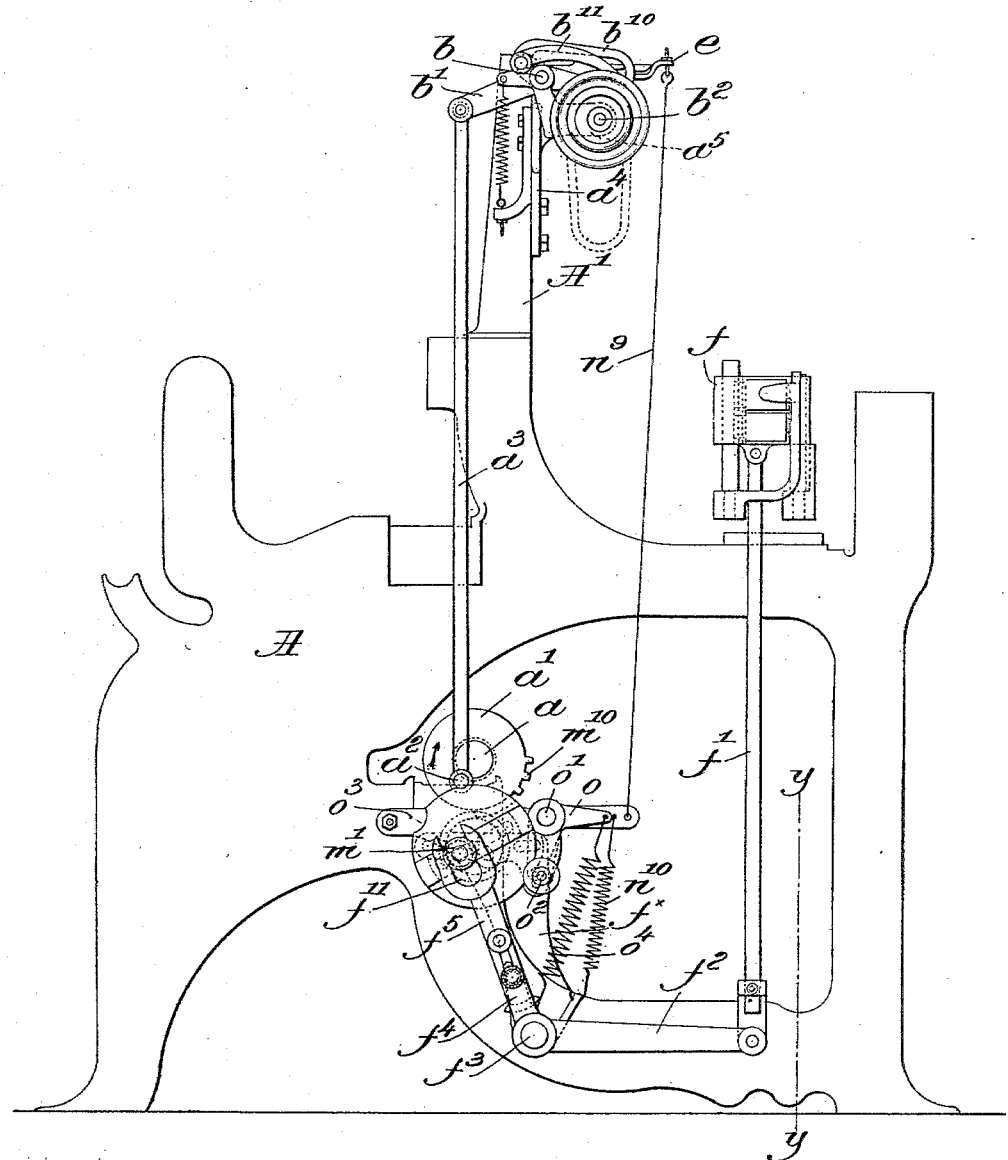

(No Model.) 6 Sheets—Sheet 1.

J. T MEATS & E. L. SARGENT.
SHUTTLE BOX OPERATING MECHANISM FOR LOOMS.

No. 596,898. Patented Jan. 4, 1898.

Witnesses.
Fred S. Greenleaf.
Thomas J. Drummond.

Inventors.
John T. Meats.
Edward L. Sargent.
by Crosby & Gregory
Attys.

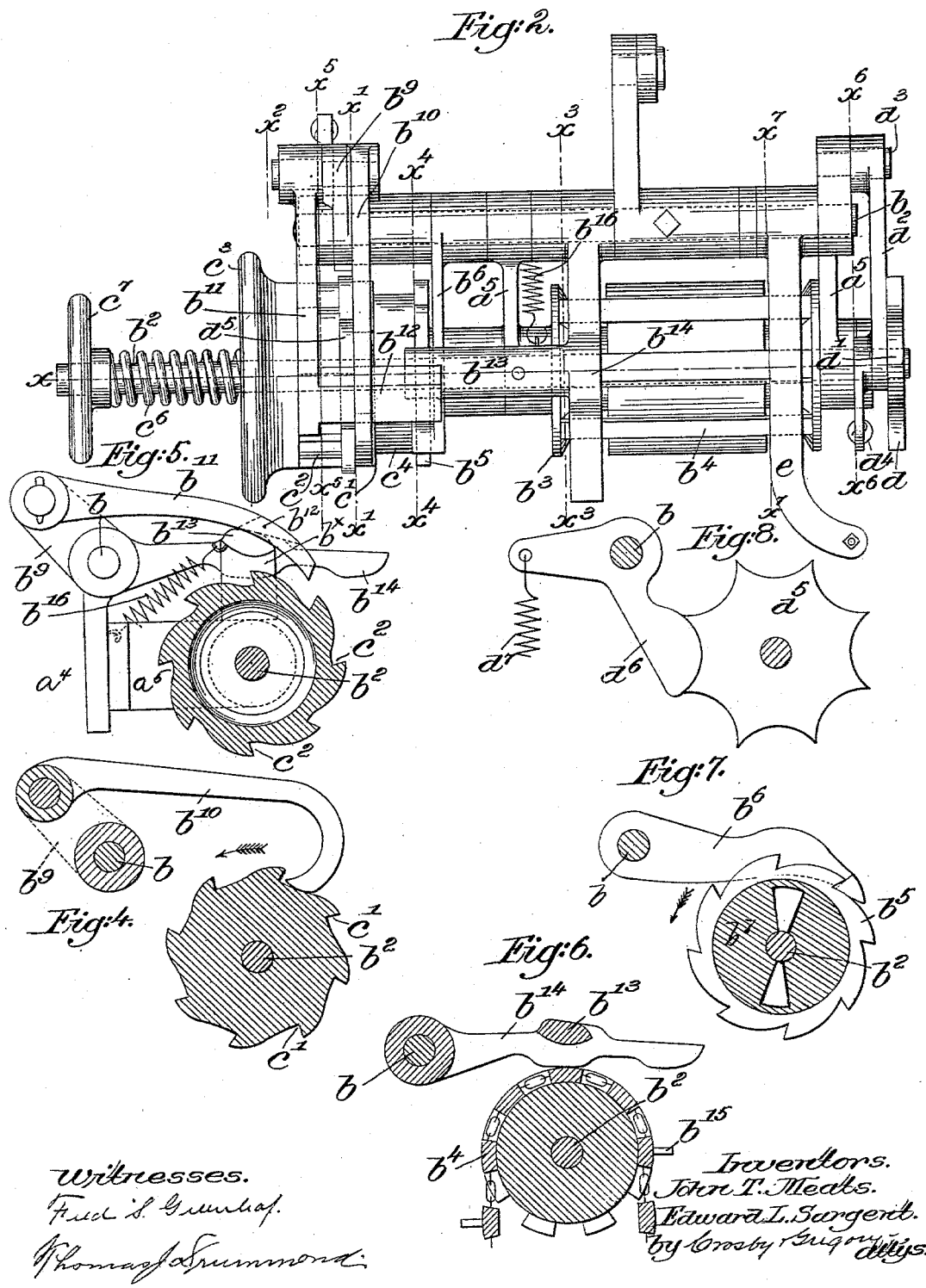

(No Model.) 6 Sheets—Sheet 3.
J. T. MEATS & E. L. SARGENT.
SHUTTLE BOX OPERATING MECHANISM FOR LOOMS.
No. 596,898. Patented Jan. 4, 1898.
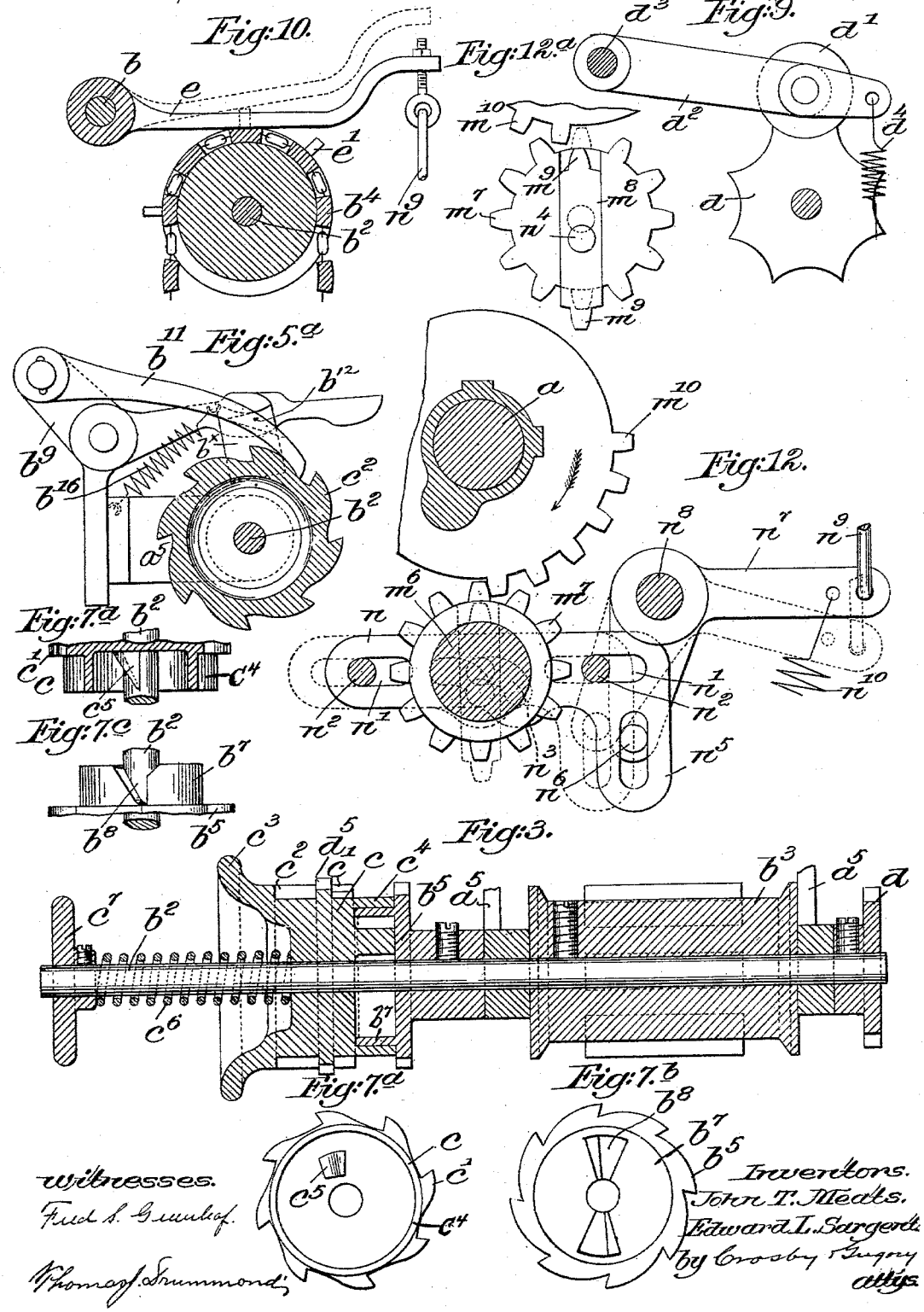
Witnesses.
Fred L. Greenleaf.
Thomas J. Drummond.
Inventors.
John T. Meats.
Edward L. Sargent.
by Crosby & Gregory
attys.

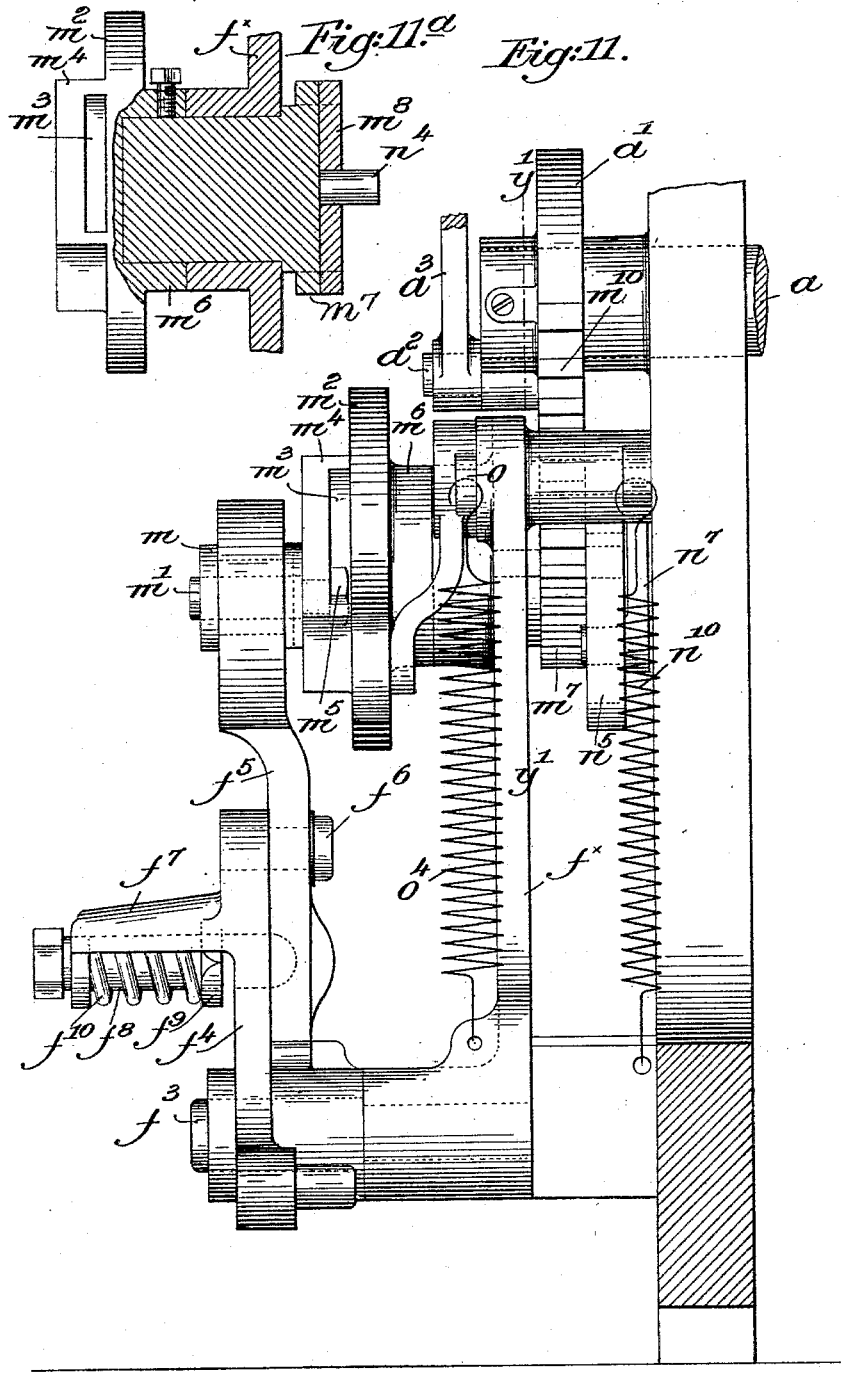

(No Model.) 6 Sheets—Sheet 5.
J. T. MEATS & E. L. SARGENT.
SHUTTLE BOX OPERATING MECHANISM FOR LOOMS.
No. 596,898. Patented Jan. 4, 1898.
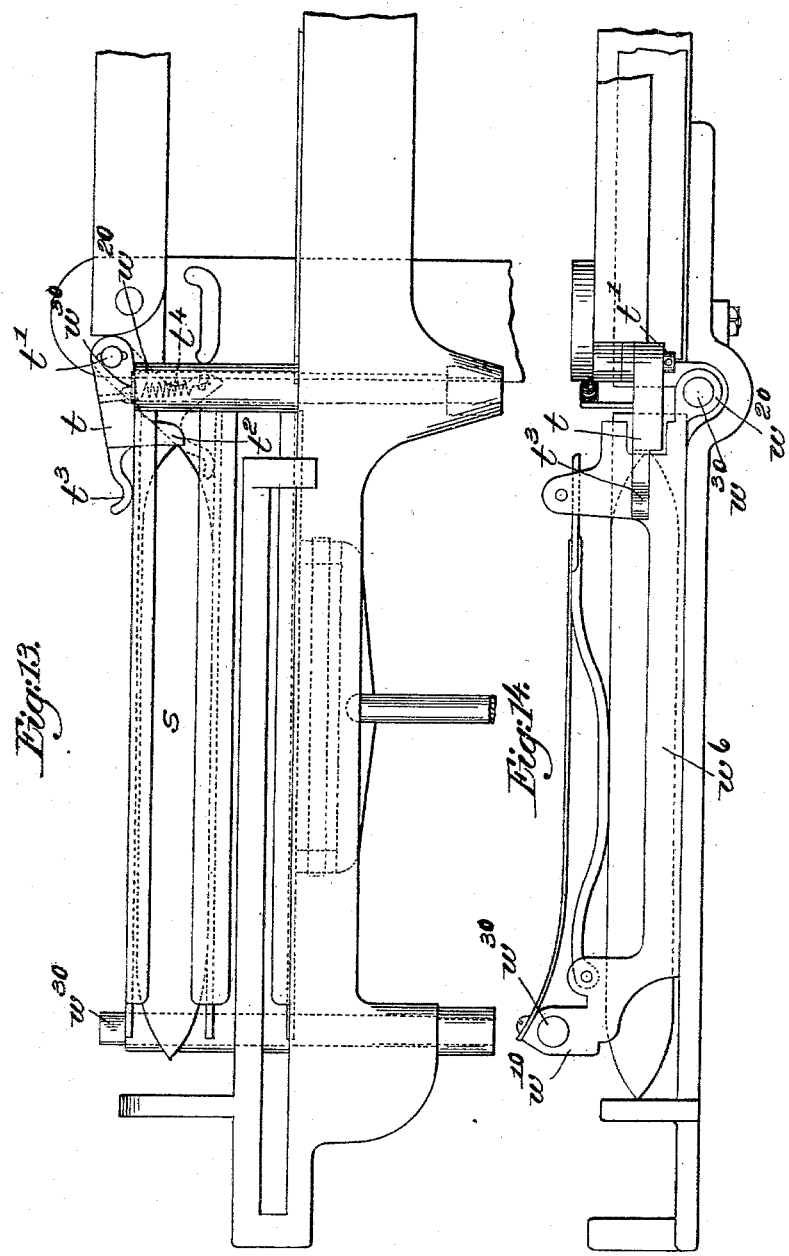

(No Model.) 6 Sheets—Sheet 6.
J. T MEATS & E. L. SARGENT.
SHUTTLE BOX OPERATING MECHANISM FOR LOOMS.
No. 596,898. Patented Jan. 4, 1898.
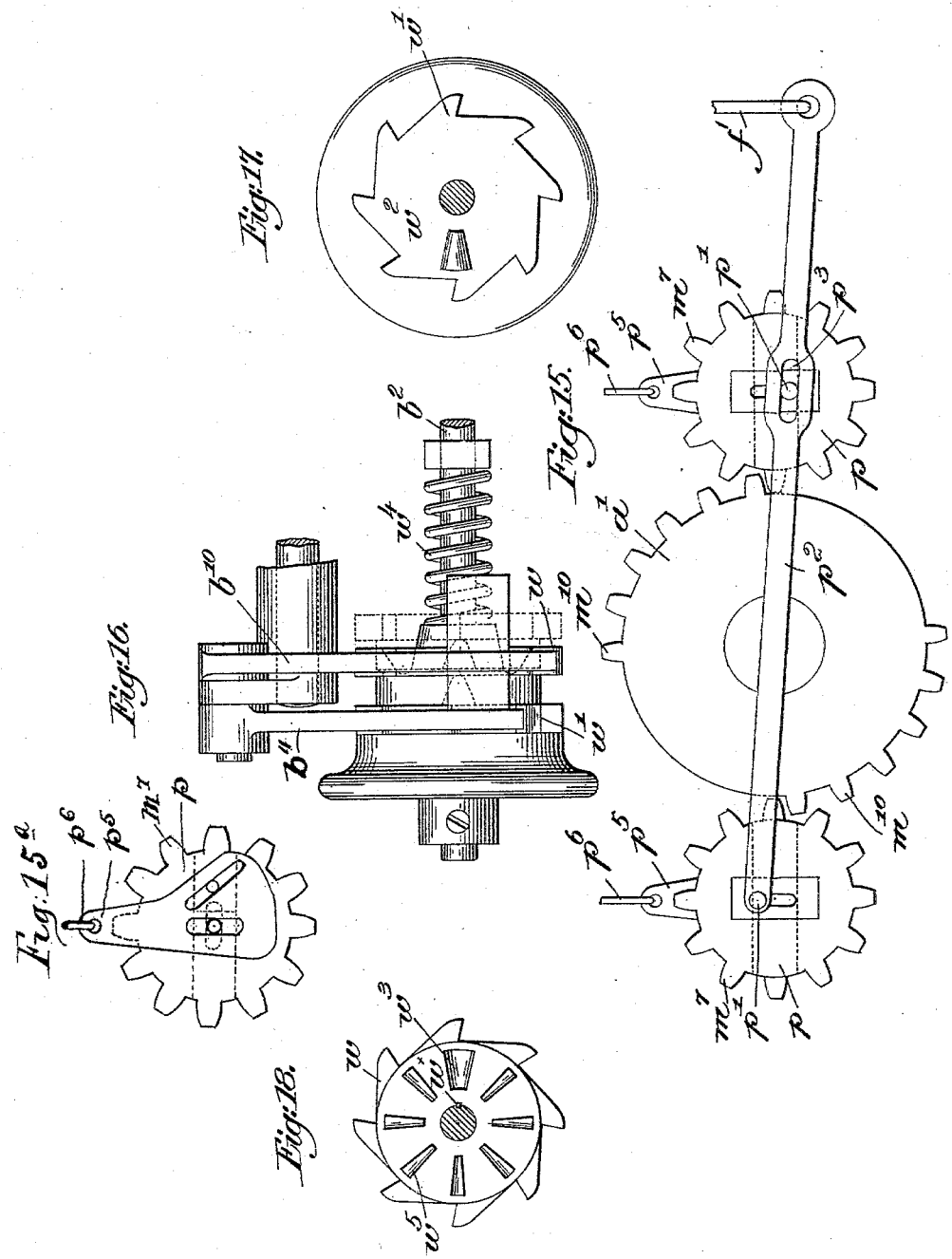
Witnesses.
Fred S. Greenleaf.
Thomas J. Drummond.
Inventors.
John T. Meats.
Edward L. Sargent.
by Crosby & Gregory
attys.

UNITED STATES PATENT OFFICE.

JOHN T. MEATS AND EDWARD L. SARGENT, OF TAUNTON, MASSACHUSETTS, ASSIGNORS TO THE MASON MACHINE WORKS, OF SAME PLACE.

SHUTTLE-BOX-OPERATING MECHANISM FOR LOOMS.

SPECIFICATION forming part of Letters Patent No. 596,898, dated January 4, 1898.

Application filed September 16, 1895. Serial No. 562,637. (No model.)

*To all whom it may concern:*

Be it known that we, JOHN T. MEATS and EDWARD L. SARGENT, of Taunton, county of Bristol, State of Massachusetts, have invented an Improvement in Shuttle-Box-Operating Mechanism for Looms, of which the following description, in connection with the accompanying drawings, is a specification, like letters on the drawings representing like parts.

This invention in looms relates particularly to what are commonly known as "multiplying" and "box" motions and to a holding device for the shuttles at rest in the shuttle-box.

In multiplying motions or mechanisms as heretofore constructed two feeding pawls or devices are provided, one to operate during the normal operation of the loom to feed the chain, the other being automatically thrown into operation when the first feeding-pawl is stopped and operating during the operation of the multiplying mechanism. As hitherto constructed these two feeding pawls or devices, one for the chain and the other for the multiplying mechanism, have been actuated through independent connections or devices from the same or, as usually the case, from different shafts or actuators, and it has been found in practice that not infrequently a part of one of the systems of connections will fail to operate properly, resulting in the simultaneous withholding from operation of both pawls or feeding devices, causing one or more mispicks in the loom. To obviate this possible error in the operation of the mechanisms, our present invention comprehends a multiplying mechanism wherein the chain-feeding and multiplying feeding pawls or devices are so arranged and constructed that it is practically impossible for both to be in or out of operation simultaneously, the withdrawal of one compelling the operation of the other, thus guarding against mispicks from the cause referred to.

Our invention also comprehends a novel box-motion wherein the movements of the shuttle-box are controlled by a gear having a movable, preferably sliding, tooth, which when moved into position constituting a part of the series of teeth at the periphery of the wheel or withdrawn from the said series acts to cause rotation or non-rotation of the wheel.

Our invention further comprehends a holding device for the shuttles not in use to prevent the same being accidentally jarred from position in the proper operation of the loom.

Figure 1, in left-hand end elevation, shows a sufficient portion of a loom to enable this invention to be understood. Fig. 2 is a top or plan view, slightly broken away, of the multiplying and chain mechanisms of the loom, Fig. 1; Fig. 3, a vertical longitudinal section of the parts shown in Fig. 2, the section being taken on the dotted line $x\ x$; Fig. 4, a sectional detail on the dotted line $x'\ x'$, Fig. 2; Fig. 5, a cross-section on the dotted line $x^2\ x^2$, Fig. 2; Fig. 5$^a$, a similar section showing the parts in the position during the dwell of the chain caused by the multiplying mechanism; Fig. 6, a cross-section on the dotted line $x^3\ x^3$, Fig. 2; Fig. 7, a cross-section on the dotted line $x^4\ x^4$, Fig. 2; Fig. 7$^a$, a right-hand side elevation of the wheel $c$, Fig. 4, which coöperates with the wheel $b^5$, Fig. 7, during the operation of the multiplying mechanism, the view looking at said wheel $c$ from its side adjacent the wheel $b^5$; Fig. 7$^b$, a face view of the wheel $b^5$ and its notched boss $b^7$; Fig. 7$^c$, a top or plan view of the wheel $b^5$, Fig. 7; Fig. 7$^d$, a top view of the wheel $c$, Fig. 7$^a$, the rim broken away to show the cam-point within the rim; Fig. 8, a cross-section on the dotted line $x^5\ x^5$, Fig. 2; Fig. 9, a cross-section on the dotted line $x^6\ x^6$, Fig. 2; Fig. 10, a cross-section on the dotted line $x^7\ x^7$, Fig. 2; Fig. 11, an enlarged sectional detail showing the parts composing the box-motion, looking from the front of the loom, the section being taken on the line $y\ y$, Fig. 1; Fig. 11$^a$, a vertical longitudinal section of a detail of Fig. 11; Fig. 12, a sectional detail on the dotted line $y'\ y'$, Fig. 11, looking to the right; Fig. 12$^a$, a detail looking at the face of the toothed wheel $m^7$, showing the slide-block $m^8$. Fig. 13 is a face view of the shuttle-box and its frame, showing the shuttle-holding device, the said view also showing our improved manner of mounting the shuttle-box; and Fig. 14, a top or plan view of the same; Figs. 15 and 15$^a$, a modification to be described; Figs. 16, 17, and 18, details of a modification to be described.

In the embodiment of our invention selected as an illustration of the same and shown in the drawings the frame A, Fig. 1, is and may be of suitable shape and construction to sustain the various working parts, the usual cam-shaft being shown at $a$, mounted in usual bearings upon the frame and provided with the usual crank-disk $a'$, provided with a crank-pin $a^2$, to which is jointed the lower end of the connecting-rod $a^3$ for imparting motion to the chain and multiplying mechanism to be described.

Secured to the usual arch $A'$ of the frame is a bracket $a^4$, provided, as shown, with suitable bearings for the shaft $b$ of the multiplying and chain motions, the said shaft having fast upon it an arm $b'$, to which the upper end of the connecting-rod $a^3$ is jointed, whereby rotation of the cam-shaft $a$ acts through its crank described to impart a rocking motion to the said shaft $b$.

Journaled in suitable arms $a^5$ of the bracket $a^4$ is the barrel-shaft $b^2$, which (see Figs. 2 and 3) has fast upon it between the said arms $a^5$ the usual chain-barrel $b^3$, about which is passed the usual chain $b^4$, shown as made in usual manner from a series of bars connected by suitable links, such chain being commonly used on dobby and harness motions.

Fast on the barrel-shaft $b^2$, outside the outer arm $a^5$, is a ratchet-wheel $b^5$, coöperating with which is a gravity-pawl $b^6$, loosely pivoted upon the shaft $b$ referred to, the teeth of the ratchet being so shaped (see Fig. 7) as to permit free rotation of the wheel and barrel-shaft in the direction of the arrow, Fig. 7, and to prevent rotation of the barrel-shaft in an opposite or retrograde direction. Upon the outer face of this ratchet-wheel $b^5$ is formed a boss $b^7$, which is shown as provided at diametrically opposite points with cam notches or recesses $b^8$, (see Figs. $7^b$ and $7^c$,) one face of which is shown as square with the face of the wheel and the other as inclined, the straight face being at that side of the notch which is in the direction of the normal rotation of the barrel—viz., the direction of the arrow, Fig. 7.

Loosely mounted upon the barrel-shaft, outside of and close to the ratchet-wheel $b^5$, is the chain-wheel $c$, provided at its periphery in the present instance with two series of ratchet-teeth, one series $c'$ (see Figs. 2 and 4) facing in the same direction as the ratchet-teeth of the wheel $b^5$ and the other series $c^2$ (see Figs. 2 and 5) facing in the opposite direction, the said wheel being provided with the usual hand-wheel $c^3$. This chain-wheel may be formed in one piece, as shown in Fig. 3, or each of the two series of ratchet-teeth may be formed on individual wheels, together constituting the chain-feed wheel, as hereinafter more fully described. The teeth $c'$ constitute the chain-feed ratchet or ratchet-wheel for moving the pattern-surface, and the teeth $c^2$ constitute the multiplier-ratchet or feed-wheel.

Upon the face of the chain ratchet-wheel $c$ adjacent the ratchet-wheel $b^5$ is shown a cylindrical flange $c^4$, (see Figs. $7^a$ to $7^d$,) within which is the laterally-extended cam point or lug $c^5$ of a shape corresponding to and adapted to fit the V-shaped notches $b^8$ in the boss of the ratchet-wheel $b^5$, the chain ratchet-wheel $c$ being normally held in its position at the right, with its cam point or lug locked in engagement with the square face of the V-shaped notch on the ratchet-wheel $b^5$, by a suitable spring $c^6$, encircling the barrel-shaft and interposed between the chain ratchet-wheel $c$ and a suitable disk-stop $c^7$, fast on the outer end of the barrel-shaft. (See Figs. 2 and 3.)

Referring now to Figs. 1 and 2, fast upon the shaft $b$ is an arm $b^9$, (shown in dotted lines, Fig. 4,) to the free end of which is jointed the chain-feed pawl $b^{10}$, the curved or hooked end of which is normally in engagement with the teeth $c'$ of the chain-feed wheel $c$, rocking movement of the shaft $b$ from the cam-shaft of the loom described causing the said chain-feed pawl $b^{10}$ to impart a step-by-step rotative movement to the chain-wheel $c$ in the direction of the arrow, Fig. 4, and also normal rotation by and with the said teeth of the ratchet-wheel $b^5$, the barrel-shaft, the barrel, and its chain.

Jointed to the outer end of the arm $b^9$ herein at its side opposite the pawl $b^{10}$ is a second multiplier-pawl $b^{11}$, (see Figs. 5 and $5^a$,) coöperating with the second series of ratchet-teeth $c^2$ upon the chain ratchet-wheel $c$, the said pawl $b^{11}$ being carried loosely over the teeth $c^2$ during the normal operation of the wheel $c$ and barrel-shaft by the feed-pawl $b^{10}$, it at such times performing no function whatsoever.

Projecting laterally from the multiplier-pawl $b^{11}$ described is a finger $b^{12}$, (see Fig. 2,) which coöperates with and during the movements of the arm $b^9$ and shaft $b$ and rides over or under an arm $b^{13}$, projecting laterally from a multiplying-lever $b^{14}$, loosely pivoted upon the shaft $b$ (see Figs. 5 and $5^a$) and acted upon at desired times by suitable pins or projecting pattern-surfaces $b^{15}$ on the chain $b^4$.

A spring $b^{16}$, connecting the arm $b^{13}$ with the bracket $a^4$, acts to hold the multiplying-lever $b^{14}$ always in contact with the chain or pin thereon.

Fast on the inner or right-hand end of the barrel-shaft, Figs. 2, 3, and 9, is the holding-wheel $d$, coöperating with which is the roller $d'$ upon the lever $d^2$, loosely pivoted upon a stud $d^3$ on an arm of the bracket $a^4$, a spring $d^4$, Fig. 9, acting to hold the said roller $d'$ always in engagement with the wheel $d$ to retain the barrel-shaft in the position into which it is moved by successive operations of the chain-wheel, the said roller also serving as a centering device to insure accurate positioning of the barrel and chain.

Referring to Figs. 2, 3, and 8, the chain-wheel $c$ has formed upon it between the two series of teeth $c'$ $c^2$ a third series of centering or holding teeth $d^5$, similar in shape to the teeth of the wheel $d$, with which coöperates a holding device or pawl $d^6$, pivoted loosely upon the main shaft $b$ and acted upon by a spring $d^7$, which holds it always in engagement with the teeth of its wheel.

Referring to Figs. 2 and 10, we have loosely mounted upon the shaft $b$ at its inner end a box-motion lever $e$, extending over the barrel, as shown in Fig. 10, and adapted to be acted upon and raised at desired times by suitable pins or projections $e'$ upon the chain, the said lever $e$ being connected, as will be described, with and to control the box-motion of the loom.

The multiplying mechanism is generally used in a loom wherein two or more shades of weft are employed or two or more grades or numbers of weft of the same color.

During the operation of the loom when the different shades or numbers of weft are laid in the fabric at frequent intervals the movements of the shuttle-box controlling the shuttles are controlled by the box-motion lever $e$ described, which is raised and dropped at the proper times by the pins $e'$ on the chain $b^4$. When, however, it is desired to weave in the same shade or number of weft for a considerable period of time, as in weaving the body of a handkerchief, table-cloth, or the like, the box-motion lever $e$ would require to remain inoperative in its lowermost position during the entire time, during which, if the chain-motion continued, the chain would move under the lever without performing any work, thereby rendering it necessary to add to the length of the chain a sufficient number of links or bars to provide for this period of inaction of the box-motion, and in many cases the chain would be of uncontrollable length.

The object of the multiplying mechanism is at such time to stop rotation of the barrel and movement of the chain during the entire period of inaction of the box-motion and to take it up again at the proper time, thus making it possible to materially shorten the chain. With this in mind the operation of the mechanism described is as follows, viz:

In the normal operation of the loom when different shades or numbers of weft are laid at frequent intervals the rotation of the cam-shaft $a$, acting through the connecting-rod $a^3$, rocks the shaft $b$ at each beat of the lay and through its arm $b^9$ and chain-feed pawl $b^{10}$ imparts to the barrel a step-by-step motion to cause the chain $b^4$ to be slowly fed beneath the levers $e$ and $b^{14}$, the pins $e'$ thereon at the proper times raising and dropping the box-motion lever $e$ to change the shuttle-box as may be necessary to lay the desired wefts. During this time the lever $b^{14}$ remains in its lowest position, supported by a stop projection $b^\times$, Fig. 5, resting upon one of the bearing-arms $a^5$ of the bracket $a^4$. When the lever $b^{14}$ is in this position, the laterally-extended finger $b^{12}$ of the multiplying-pawl $b^{11}$ during the reciprocations of the latter coincident with the reciprocations of the chain-feed pawl rides upon the laterally-extended arm $b^{13}$ of the said lever $b^{14}$, which holds the said multiplying-pawl in its position, Fig. 5, out of engagement with the series of teeth $c^2$. When it is desired to stop movement of the chain $b^4$ for, say, ten or more picks, a pin $b^{15}$, Fig. 6, is inserted in one of the bars of the chain at the proper point, which when it reaches the lever $b^{14}$ raises the same, so that upon the next subsequent return movement of the two pawls $b^{10}$ and $b^{11}$ referred to the rear edge of finger $b^{12}$ of the pawl $b^{11}$ will pass beneath the laterally-extended arm $b^{13}$ of the said lever $b^{14}$, as in Fig. 5$^a$, instead of riding over the same, which will permit the said multiplying-pawl $b^{11}$ to engage one of the teeth $c^2$ and upon the next forward movement of the pawl rotate the chain-wheel $c$ one step or tooth in a direction opposite the normal rotation by the feed-pawl $b^{10}$, which opposite rotation, the barrel and ratchet-wheel $b^5$ being held stationary by the pawl $b^6$, causes the cam point or lug $c^5$ on the chain-wheel to ride up the inclined face of the engaging notch $b^8$ in the boss of the said wheel $b^5$, thereby disengaging the chain-wheel from the ratchet-wheel $b^5$. This movement of the chain-wheel upon the barrel-shaft, caused by the cam-lug rising from its notch, moves the series of teeth $c'$ of the chain-wheel laterally to the left, Fig. 2, out from under and from engagement with the feed-pawl $b^{10}$, which thereafter rides during its reciprocations upon the cylindrical flange $c^4$ on the said chain-wheel described. The chain-wheel $c$ is now under the control of the multiplying-pawl $b^{11}$, which at each rocking movement of the shaft $b$ rotates the chain-wheel one step or tooth in a retrograde direction, this retrograde movement continuing until the cam point or lug $c^5$ reaches the same or another notch $b^8$ in the boss $b^7$, whereupon the spring $c^6$ will restore the chain-wheel again to its position at the right, the said cam-lug moving into the said notch to thereby again lock the chain-wheel to the ratchet-wheel $b^5$ and by the return movement carrying the teeth $c'$ beneath and to be engaged by the feed-pawl $b^{10}$, which at the first backward or feeding movement engages one of the teeth $c'$ and rotates the chain-wheel and the barrel one step in the normal direction, carrying the pin $b^{15}$ from under the lever $b^{14}$ and dropping the latter and its arm $b^{13}$ to cause the multiplying-pawl $b^{11}$ to be raised by said arm from engagement with the teeth $c^2$, whereupon the operation continues as before.

By varying the number and location of the multiplying-pins $b^{15}$ the frequency of operation of the multiplying mechanism may be varied, and by varying the number and location of the notches $b^8$ the number of picks taking place while the chain is held stationary may also be varied.

In the device shown there are eight teeth $c^2$ coöperating with the multiplying-pawl, and there are two notches $b^8$ arranged at diametrically opposite points. Therefore a movement equivalent to four teeth takes place between the two notches, and as there are two picks, an outward and a return, for each rocking movement of the shaft $b$ it will be understood that eight picks will take place during the period of rest of the chain.

Should there be only one notch $b^8$ in the wheel shown, sixteen picks will take place during the period of rest of the chain, laying during that time weft-thread of the same color or number.

It is evident that the number of picks taking place during the period of rest of the chain may be also varied by varying the teeth $c^2$.

The advantages of the multiplying mechanism described are, briefly, as follows, viz:

The sliding chain-wheel $c$ controls, by its position either to the right or to the left, both the regular feeding-motion of the chain and the multiplying-motion, and it matters not which motion is thrown in the other is by virtue of the position of the chain-wheel necessarily held out of operation, so that there can be no possibility of both motions or mechanisms being in or out of operation simultaneously. This is distinguished from the multiplying mechanism or motion before mentioned, wherein both the regular chain-feed motion and the multiplying-motion are independently operated through independent systems of connections from separate shafts, and it is not only possible, but a frequent occurrence, that by reason of some improper operation of a part in one of the systems of connections both systems are thrown simultaneously into or simultaneously held out of operation, causing one or more mispicks of the loom.

In our invention it is impossible for a mispick to occur from this cause, for one or the other of the mechanisms is necessarily in operation at all times and the other is as necessarily held out of operation, it being practically impossible to have both mechanisms out of or in operation simultaneously.

In Figs. 16, 17, and 18 we have illustrated the modification of the multiplier mechanism in which, instead of sliding both the chain and multiplier ratchets to the left when it is desired to change from the regular chain-feed to the multiplier-feed, the two ratchets are split or separated and one only is moved. For example, in Fig. 16 on the shaft $b^2$ we have mounted the chain-feed ratchet-wheel $w$ and the multiplier-ratchet $w'$, the latter shown as loose upon said shaft, the former splined thereupon, the spline being shown at $w^\times$, Fig. 18. The multiplier-ratchet $w'$ has upon its inner face a tapering lug $w^2$, which when in proper position relatively to the chain-ratchet enters a pocket $w^3$ in the latter, locking the two together, a spring $w^4$ pressing the chain-ratchet toward and holding it locked with the multiplier-ratchet. When the multiplier-pawl is dropped into engagement with its ratchet, as in the multiplier mechanism, Figs. 1 to 10, inclusive, the first rotative movement of the multiplier-ratchet will cause the beveled sides of its lug $w^2$ to push the chain-ratchet to the right, Fig. 16, and disengage it from the multiplier-ratchet. This lateral or side movement of the chain-ratchet, Fig. 16, disengages the latter from its pawl $b^{10}$, it remaining disengaged until the multiplier-ratchet has made one complete rotation, when the two are again locked, as described.

The chain-ratchet $w$, Fig. 18, at its inner face is provided with a series of slight depressions $w^5$, into which at each stop in its movement the point of the lug $w^2$ drops to hold the multiplier against retrograde movement during the return of its actuating-pawl, the depressions $w^5$, however, being so slight as not to interfere with the movement of the ratchet when the latter is pushed over by its pawl.

Referring now particularly to Figs. 1, 11, and 12, the shuttle-box $f$ is herein shown as adapted to contain two shuttles, the same being supported upon a suitable lift-rod $f'$, jointed at its lower end to one arm $f^2$ of a bell-crank lever pivoted at $f^3$ upon a stud bracketed upon the end frame of the loom and having its other arm made as a compound or multipart lever—that is, in two members $f^4$ and $f^5$. (See Fig. 11.) The two members are shown as jointed together at $f^6$, one of the members, as $f^4$, having a laterally-extended bearing or housing $f^7$ for the sliding pin $f^8$, shouldered at $f^9$ and surrounded by a spring $f^{10}$, which presses the said pin normally to the right with the rounded or beveled end protruding through the said member $f^4$ into a suitable recess or depression in the other member $f^5$, thereby locking the two members of the arm together as one by the frictional engagement of the pin with the walls of the depression.

During the operation of the loom a stress thrown upon the bell-crank lever such as would ordinarily break the same will in the construction shown cause disengagement of the pin $f^8$ and its recess in the member $f^5$ of the lever, permitting the two members to buckle, thereby preventing breakage, and as the shuttle-box will not at such a time be moved the loom will automatically stop.

The compound or multipart arm of the bell-crank lever referred to is shown forked to straddle a roller $m$ upon a crank-pin $m'$ on the face-plate $m^2$, the said crank-pin being adjustable to vary its distance from the axis of rotation of the base-plate by means of its threaded end extended through a slot $m^3$ in a bridge $m^4$ (see Fig. 11) on the face-plate, a nut $m^5$ within the bridge and upon the said threaded shank serving to clamp the pin in its desired position.

The face-plate $m^2$ is (see Fig. 11ª) made fast upon the end of the hub $m^6$ of the toothed wheel $m^7$, jounaled in the bracket $f^\times$ on the end frame.

The toothed wheel $m^7$ at its inner face adjacent the end frame of the loom is provided with a diametrical groove, which receives the sliding block $m^8$, herein shown as provided at its opposite ends with gear-teeth $m^9$, the length of said block in the present instance being such that when in a central position the teeth at its opposite ends are in line with and form a part of the series of the teeth at the periphery of the wheel $m^7$. A toothed surface coöperates with the teeth $m^7$ as a driver therefor, this surface consisting in the present instance of a series of teeth $m^{10}$ upon the periphery of the crank-disk $a'$ on the crank-shaft, (see Figs. 1 and 12,) the number of teeth $m^{10}$ being such as to give a one-half rotation only to the wheel $m^7$.

Between the bracket $f^\times$ and the end frame of the loom is arranged a cam-plate $n$, slotted at its ends, Fig. 12, at $n'$ to receive the guide-pins $n^2$, projecting inwardly from the bracket $f^\times$ and which permit a limited longitudinal or sliding movement of the cam-plate.

Between the slots $n^2$ the cam-plate $n$ is provided with a curved or cam slot (shown in dotted lines at $n^3$, Fig. 12) which receives a pin $n^4$ on the face of the sliding toothed block $m^8$. When the cam-plate is moved or slid from its position, Fig. 12, to the left, the cam-slot $n^3$ will depress the pin $n^4$ and thereby move the slide-block down into its dotted position, withdrawing the tooth at its upper end from the series into position below the periphery of the wheel, and, of course, when the cam-plate is returned again to its full-line position, Fig. 12, the slide-block will be raised to restore the tooth at its upper end to its position in the series $m^7$.

The cam-plate $n$ at one end is shown as provided with a depending arm $n^5$, slotted vertically to receive a pin $n^6$ on a bell-crank lever $n^7$, pivoted at $n^8$ upon the bracket $f^\times$ and having its other arm connected by a wire $n^9$ with the box-motion lever $e$ referred to, a spring $n^{10}$, Fig. 12, connecting the said bell-crank lever $n^7$ with the bracket, acting to normally depress the lever and throw the cam-plate into its position at the left, Fig. 1, when permitted, by the dropping of the box-lever $e$, due to the removal from under it of one of the pins $e'$.

Referring to Fig. 1, $o$ is a bell-crank lever pivoted at $o'$ to the bracket $f^\times$ and having one of its arms provided with a roller $o^2$, adapted to enter one or the other of the diametrically-located depressions $o^3$ in the periphery of the face-plate $m^2$ and having its other arm acted upon by a spring $o^4$, connected with the bracket $f^\times$, which holds the said roller always against the periphery of the said face-plate, said roller, under the action of its spring, serving to retain the face-plate in one or the other of the positions into which it was moved.

The operation of the box-motion is as follows, viz: The cam-shaft $a$ rotates continuously in the direction of the arrow, Fig. 1, and, assuming that a change in the shuttle-box is called for, one of the pins $e'$ on the chain will lift the box-motion lever $e$ and thereby, through the wire $n^9$ and bell-crank lever $n^7$, shift the cam-plate into its extreme right or full-line position, Fig. 12, to raise the block $m^8$ into position with the tooth at its upper end in line with and forming a part of the series of teeth $m^7$, so that when the first of the series of teeth $m^{10}$ on the crank-disk $a'$ on the cam-shaft reaches the position shown in Fig. 12 it will engage the tooth on the slide-block and, with the other teeth following it in the series, cause a rotation of the wheel $m^7$ through one hundred and eighty degrees—that is, a one-half rotation of the wheel—such half-rotation of the wheel (see Fig. 1) being sufficient to carry the crank-pin $m'$ from its position, Fig. 1, into a position diametrically opposite to thereby turn the bell-crank lever $f^2$ and drop the shuttle-box to present a new shuttle. Should a return of the shuttle in the shuttle-box back to its original position be required at the end of a return or second pick, a second pin $e'$ on the chain will reach a position beneath and sustaining the box-lever $e$ still in its elevated position, so that when the series of teeth $m^{10}$ on the crank-disk during rotation of the latter again meet the teeth of the wheel $m^7$ the said wheel $m^7$ will be rotated, as before, through a one-half rotation to act through the crank-pin $m'$ to restore the shuttle-box to its original position. After the box-motion lever $e$ has been once raised and, as described, caused the shuttle-box to be shifted should it be desired to permit the shuttle-box to remain in its new position through a second cycle—that is, through four picks—said lever $e$ will be permitted to drop after the pin which raised it has passed and by dropping permit the spring $n^{10}$ to return the bell-crank lever $n^7$ to its original position, shifting the cam-plate to its extreme position at the left, and, acting through the cam-slot $n^3$, to drop the slide-block $m^8$ and thereby withdraw the tooth $m^9$ from the series $m^7$ and permit the teeth upon the cam-disk to pass without catching and rotating said wheel $m^7$. The cam-plate is permitted to remain in its spring-operated position through as many picks as desired, when a pin $e'$ will lift the box-motion lever, shift the cam-plate, raise the slide-block $m^8$, and place a tooth in the series $m^7$, so that the teeth upon the crank-disk will catch the said tooth and cause a one-half rotation of the wheel $m^7$ and a change in the shuttle-box.

The teeth $m^{10}$ and $m^7$ must of course be so proportioned one to the other that when the slide-block is down and its teeth withdrawn from the series the said teeth $m^{10}$ will clear the fixed teeth $m^7$, it being necessary that one of the teeth upon the slide-block should be lifted to cause engagement of the two series of teeth and the rotation of the wheel $m^7$ by and through the cam-disk.

The radial movement of the movable teeth, as $m^9$, is much preferable to an axial movement of such teeth or equivalent devices, and by making such movable teeth similar to the fixed teeth on the driven gear, so as to coöperate as one series with such fixed teeth when the driven gear is rotated, a much more compact mechanism may be had and the driven gear started and stopped with greater certainty and with less liability to wear and derangement than where the movable teeth are made much larger than the fixed teeth of the driven gear or where they are made of distorted or irregular shapes different from the fixed teeth.

Our improvement, as herein disclosed, also presents manifest advantages over any mechanism wherein movable teeth or equivalent devices are employed on the driver instead of the driven gear.

In Fig. 15 we have shown a modification of our box-motion, wherein two gears corresponding to the gears $m^7$ are employed (indicated at $p\ p$) at opposite sides of the crank-disk $a'$, their face-plates having crank-pins corresponding to the pin $m'$, Fig. 11, connected with a common lever $p^2$, jointed to one of the pins $p'$ and slotted at $p^3$ to receive the other, the said lever at its outer end having jointed to it at $p^4$ the lifting-rod $f'$. The cam-plates $p^5$, each provided with a suitable cam surface or slot—for example, like the cam surface or slot $n^3$, Fig. 12—for the two wheels $p$, are connected by suitable wires $p^6$ with, in this instance, two box-motion levers $e$, controlled by two series of pins $e'$ parallel with each other upon the chain. By means of these two cam-plates and the sliding blocks and teeth controlled thereby we are enabled to attach our box-motion to a shuttle-box containing three or four shuttles. The lever $p^2$ is so proportioned with relation to the throw of the two crank-pins $p'$ that a one-half rotation of the wheel $p$, which is at the left, Fig. 15, will move the lever $p^2$ on the other crank-pin $p'$ as a fulcrum such a distance as will lift the shuttle-box a distance to change the same one pocket or shuttle. A one-half rotation of the right-hand wheel $p$ with the left-hand wheel in the position shown in Fig. 15 will shift the shuttle-box two pockets, or from the first to the third, or from the second to the fourth, while a simultaneous opposite one-half rotation of the two wheels $p$ will move the shuttle-box four pockets. In this construction, Fig. 15, two series of teeth $m^{10}$ at diametrically opposite points are provided upon the crank-disk $a'$.

Figs. 13 and 14 show the manner of mounting the shuttle-box and our novel shuttle-holding device. Referring to the said figures the shuttle-box $w^6$ is and may be of suitable or desired construction, except as to its bearings, the said shuttle-box in the present instance being provided at its opposite ends and at opposite sides, respectively, with ears $w^{10}\ w^{20}$, provided, respectively, with vertical holes for the reception of the cylindrical guide-pins $w^{30}$. These cylindrical guide-pins and holes are employed as distinguished from the flat or plane-faced bearing-surfaces and guides now commonly employed, our construction being superior to the flat-faced bearings in that the holes in the ear $w^{10}$ may be easily and accurately drilled, which is a much simpler operation than a planing of the flat faces, and in addition thereto a larger bearing-surface—that is, a surface having a greater superficial area—is provided, showing less wear of parts. The guide-pins $w^{30}$ are set into holes drilled into the solid part of the frame, and hence are immovable, and the adjustment of the box can never be out.

$t$ is the positioning or holding device for the shuttles, the same, as shown, being pivoted at $t'$ on a pin projecting forwardly from a bracket on the lay and having a depending arm $t^2$ and a forwardly-extended finger $t^3$, a spring $t^4$ holding it normally in its lowermost position. In the position Fig. 13 the finger $t^3$ rests upon the top of the shuttle-box, the downwardly-extended arm $t^2$ in such position standing in front of the shuttle $s$ in the upper pocket of the box and preventing the same moving to the right or escaping from its pocket.

When the shuttle-box drops to present the shuttle $s$ in position to be driven across the face-plate, the holding device $t$ is then automatically turned into its dotted-line position, Fig. 13, thereby raising the arm $t^2$ relatively to and to clear the point of the shuttle, so as not to interfere with driving the shuttle from the box. When the shuttle-box is again raised, the holding device is thereby turned on its pivot into its full-line position, the arm $t^2$ catching the point of the shuttle, if the latter is not quite bottomed in the pocket, and completing the shuttle movement, pushing the latter to its extreme position and holding it in such position against possible escape or movement by the vibrations or movements of the lay.

We are the first, so far as we are aware, to provide a device for finally pushing the shuttle home to its position in the box should it fail to reach or rebound from its position when thrown by the picker-stick.

In the present instance of our invention we have shown the chain and multiplier feeding devices as pawls engaging toothed wheels; but it is obvious our invention is not limited to this particular type of feeding device and wheel, as any well-known equivalent device may be employed. In other respects also our invention is not limited to the particular embodiment shown, for the same obviously may be varied within the spirit and scope of our invention.

We claim—

1. In a loom, a pattern-surface; a ratchet chain-feed wheel therefor, its coöperating reciprocating chain-feed pawl; a multiplier-ratchet feed-wheel and its coöperating reciprocating multiplier feed-pawl, and means to automatically cause a relative lateral movement of one of said ratchet feed-wheels and its feed-pawl for engaging and disengaging the same, substantially as described.

2. In a loom, a pattern-surface; a ratchet chain-feed wheel therefor, its coöperating reciprocating chain-feed pawl; a multiplier-ratchet feed-wheel and its coöperating reciprocating feed-pawl, and means to automatically cause a lateral movement of the said pattern ratchet feed-wheel, and to alternately throw said reciprocating feed-pawls out of operation, substantially as described.

3. In a loom, a pattern-surface; a ratchet chain-feed wheel therefor, its coöperating reciprocating feed-pawl; a multiplier-ratchet feed-wheel and its coöperating reciprocating feed-pawl; a common shaft on which said feed-wheels are rotatably mounted, and means to move said feed-wheels laterally into and out of operative relation with the former of said feed-pawls, substantially as described.

4. In a loom, a pattern-surface; a feeding device therefor and its feed-wheel; means for imparting a relative lateral movement to the said feeding device and its wheel to render the former operative or inoperative; a multiplier feeding device and its feed-wheel; and means controlled by the pattern-surface to move said multiplier feeding device into and out of engagement with its feed-wheel, all of said feeding devices and said feed-wheels being controlled by said pattern-surface, substantially as described.

5. In a loom, a pattern-surface; a feeding device therefor and its feed-wheel; a multiplier feeding device and its feed-wheel; means to cause lateral movement of said feed-wheels together for rendering said pattern-surface feeding device operative or inoperative; and means controlled by said pattern-surface for moving the said multiplier feeding device into and out of operation, substantially as described.

6. In a loom, a pattern-surface; a chain-wheel therefor; a common shaft on which said pattern-surface and said chain-wheel are mounted, locking-surfaces connecting the latter two and arranged to rotate the one by the other in one direction, and one independently of the other in an opposite direction, said chain-wheel having oppositely-facing teeth thereon, and coöperating feeding devices to engage said teeth to rotate said chain-wheel in said opposite directions, substantially as described.

7. In a loom, a pattern-surface; a feeding device therefor and a multiplier feeding device; toothed wheels for the respective feeding devices coöperating to move together in one direction; means to impart a relative lateral movement to one of said feeding devices and its coöperating toothed wheel, and to raise and lower the other of said feeding devices to thereby alternately disengage and engage the said feeding devices and their respective toothed wheels, substantially as described.

8. In a loom, a pattern-surface; two oppositely-facing series of teeth arranged to rotate about a common axis; the oppositely-acting feeding devices and means to actuate the same; a controlling-lever controlled as to its position by said pattern-surface and adapted to positively cause engagement or disengagement of one of said feeding devices and its series of teeth; the said feeding device being normally disengaged from its series of teeth; and means actuated by said feeding device to effect engagement and disengagement of the other of said feeding devices and its series of teeth, substantially as described.

9. In a loom, a pattern-surface; a shaft, the toothed wheels thereon; the coöperating pawls, a cam-surface on one of said toothed wheels, a coöperating cam-surface therefor, whereby rotative movement of said cam-wheel and its cam-surface relative to the other cam-surface causes lateral or axial movement of said wheel relatively to its coöperating pawl, substantially as described.

10. In a loom, a pattern-surface; oppositely-facing toothed wheels; the feed and multiplier pawls coöperating therewith, said wheels being connected to move together by the engagement of said feed-pawl with its toothed wheel, and to have independent relative movement by the engagement of said multiplier-pawl with its toothed wheel; and a multiplier-lever moved by said pattern-surface, said pattern-surface thereby determining by its position the engagement and non-engagement of said multiplier-pawl and its toothed wheel, substantially as described.

11. In a loom, a pattern-surface; oppositely-facing toothed wheels and the coöperating feed and multiplier pawls; a multiplier-lever moved by said pattern-surface and determining by its position the engagement and non-engagement of said multiplier-pawl and its toothed wheel; and means to move the said feed-pawl and toothed surfaces laterally one with relation to the other to engage and disengage said feed-pawl and its toothed wheel, substantially as described.

12. A multiplier attachment for looms containing the following instrumentalities, viz:— a pattern-surface; a shaft; the toothed wheels thereon; and coöperating pawls; the coacting cam-surfaces on the said wheels; and a spring acting in opposition to the said cam-surfaces whereby rotative movement of one of said wheels relatively to the other causes lateral or axial cam-actuated movement of one of said wheels relatively to its pawl; opposite rotative movement of the said wheel causing spring-actuated return of the said wheel to its original position relative to its pawl, substantially as described.

13. In a loom, a rotating shaft; a crank; a shuttle-box; a two-member lever intermediate said crank and shuttle-box through which motion of the latter is imparted by and from the former, the said two members of the lever being overlapped and pivoted together adjacent the end of one of them, the latter being provided with a lateral extension having a bearing at its outer end and carrying a shouldered pin therein, a spring being interposed on said pin between said bearing and the shoulder of said pin entering through its lever member into a recess provided therefor in the other of said lever members, substantially as described.

14. The combination with a moving toothed surface constituting a driver, of a driven gear having a plurality of toothless spaces, movable teeth for the respective spaces similar to the fixed teeth of the driven gear, and means to move said movable teeth, as required, into uniform alinement with the fixed teeth on said driven gear, so as to coöperate as one series therewith, and to withdraw said movable teeth from said series, thereby to impart desired intermitting rotation to said driven gear.

15. The combination with a moving toothed surface constituting a driver, of a driven gear having a plurality of toothless spaces, teeth radially movable on the driven gear for the respective spaces, said teeth being rigidly connected, whereby radial movement of one causes a radial movement of the other.

16. In a loom, the combination with a moving toothed surface constituting a driver; a driven gear having a plurality of toothless spaces; a shuttle-box, and operating connections intermediate the same and said driven gear; of the radially-movable block having a tooth at each end thereof for said toothless spaces, and means for moving said teeth into and out of position for engagement with said driver as required.

17. In a loom, the combination with a moving toothed surface constituting a driver; a driven gear having oppositely-arranged toothless spaces; a shuttle-box and operating connections therefor intermediate the same and said driven gear; of the radially-movable teeth for said toothless spaces, said teeth being permanently spaced equal to the diameter of the gear; and means for radially moving the said teeth into and out of position for engagement with said driver as required.

18. In a loom, the combination with the moving toothed surface constituting a driver, a driven gear having a plurality of toothless spaces, a shuttle-box, and operating connections intermediate the same and said driven gear, of teeth radially movable on the said driven gear for the respective spaces, said teeth being rigidly connected, whereby radial movement of one causes a radial movement of the other, thereby to impart desired intermitting rotation to said driven gear and movement to said shuttle-box.

19. In a loom, the combination with a moving toothed surface constituting a driver; a driven gear having a toothless space; the shuttle-box; its operating mechanism intermediate the same and said driven gear; a movable tooth for said toothless space; a sliding cam for shifting said movable tooth into and out of position for engagement with said driver and means for sliding said cam, substantially as described.

20. In a loom, the combination with a lay, of a shuttle-box, and a shuttle-positioning device operated by shifting movement of the shuttle-box on and with relation to said lay to act upon and move a shuttle in said shuttle-box, substantially as described.

21. In a loom, the combination with a lay, and a shifting shuttle-box mounted thereon, of a pivoted shuttle-positioning device movable with said lay and caused to swing by engagement with the shuttle-box when shifting, and thereby move into and out of shuttle-holding position, substantially as described.

22. In a loom, the combination with a lay, and a shifting shuttle-box mounted thereon, of a combined shuttle positioning and holding device to act upon and both move to final position and hold in such position a shuttle not in use, substantially as described.

23. In a loom, the pattern-surface; the feed and multiplier wheels, pawls for rotating the same in opposite directions, and a common pawl-carrier for and to move both pawls; and means relatively to move laterally the former of said wheels and its pawl into and out of operative relation, substantially as described.

24. In a loom, the combination with a moving toothed surface constituting a driver, of a driven gear having one or more toothless spaces, the shuttle-box and operating devices therefor intermediate the same and said driven gear, a movable tooth for said toothless space, said tooth having a radial movement toward and from the axis of said gear, a sliding cam controlling the position of said movable tooth, a pattern-surface, and connections between the same and said sliding cam for controlling the latter by the former, substantially as described.

In testimony whereof we have signed our names to this specification in the presence of two subscribing witnesses.

JOHN T. MEATS.
EDWARD L. SARGENT.

Witnesses:
E. W. DEAN,
J. S. EATON.